(12) United States Patent
O'Brien et al.

(10) Patent No.: US 8,549,610 B2
(45) Date of Patent: Oct. 1, 2013

(54) NETWORK-BASED SECURITY SERVICES FOR MANAGED INTERNET SERVICE

(75) Inventors: Christopher O'Brien, Incline Village, NV (US); Joseph Blanda, Jr., Flemington, NJ (US); William Rehrmann, San Jose, CA (US); Markus Weber, Pflugerville, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 710 days.

(21) Appl. No.: 12/636,286

(22) Filed: Dec. 11, 2009

(65) Prior Publication Data

US 2011/0145911 A1 Jun. 16, 2011

(51) Int. Cl.
*H04L 29/06* (2006.01)

(52) U.S. Cl.
USPC .................. 726/13; 726/14; 726/15; 713/151; 713/152; 713/153; 713/154

(58) Field of Classification Search
USPC ...................................... 713/162; 726/23, 13
See application file for complete search history.

(56) References Cited

U.S. PATENT DOCUMENTS

2005/0278784 A1* 12/2005 Gupta et al. .................... 726/23
2007/0192593 A1*  8/2007 Boisjolie et al. .............. 713/162

* cited by examiner

*Primary Examiner* — Longbit Chai
(74) *Attorney, Agent, or Firm* — Hartman & Citrin LLC

(57) ABSTRACT

Data traffic is routed from a customer edge (CE) router to an Ethernet services router via a generic routing encapsulation (GRE) tunnel. Upon routing the data traffic from the CE router to the Ethernet services router, the data traffic is routed from the Ethernet services router to an aggregation switch. Upon routing the data traffic from the Ethernet services router to the aggregation switch, the data traffic is routed from the aggregation switch to a service switch through a security module, the security module configured to filter the data traffic. The filtered data traffic is routed from the service switch to the Ethernet services router. Upon routing the filtered data traffic from the service switch to the Ethernet services router, the filtered data traffic is routed from the Ethernet services router to a provider edge (PE) router.

20 Claims, 4 Drawing Sheets

NETWORK-BASED SECURITY SERVICES FOR MANAGED INTERNET SERVICE

BACKGROUND

This application relates generally to the field of network-based security services. More specifically, the disclosure provided herein relates to providing network-based security services for managed Internet service.

Some Internet providers offer managed Internet service to certain customers, and in particular, business customers. Managed Internet service typically provides these business customers with a dedicated, high-speed Internet connection. Managed Internet services may be entirely or largely managed by the Internet provider. For example, the Internet provider may monitor the Internet connection and provide technical assistance if necessary.

Internet providers may offer additional managed services to customers as a source of additional revenue. For example, an Internet provider may offer security services, such as a firewall. Conventionally, the Internet provider may individually install the firewall at each customer premise. While such an approach may be acceptable when the number of customers is small, managing, monitoring, and updating the firewall for each customer can become unduly burdensome as the number of customers increases.

SUMMARY

Embodiments of the disclosure presented herein include methods, systems, and computer-readable media for providing network-based security services. According to one aspect, a method for providing network-based security services is provided. According to the method, data traffic is routed from a customer edge (CE) router to an Ethernet services router via a generic routing encapsulation (GRE) tunnel. Upon routing the data traffic from the CE router to the Ethernet services router, the data traffic is routed from the Ethernet services router to an aggregation switch. Upon routing the data traffic from the Ethernet services router to the aggregation switch, the data traffic is routed from the aggregation switch to a service switch through a security module, the security module configured to filter the data traffic. The filtered data traffic is routed from the service switch to the Ethernet services router. Upon routing the filtered data traffic from the service switch to the Ethernet services router, the filtered data traffic is routed from the Ethernet services router to a provider edge (PE) router.

According to another aspect, a system for providing network-based security services is provided. The system includes a memory and a processor functionally coupled to the memory. The memory stores a program containing code for providing the network-based security services. The processor is responsive to computer-executable instructions contained in the program and configured to perform the following operations. Data traffic is routed from a customer edge (CE) router to an Ethernet services router via a generic routing encapsulation (GRE) tunnel. Upon routing the data traffic from the CE router to the Ethernet services router, the data traffic is routed from the Ethernet services router to an aggregation switch. Upon routing the data traffic from the Ethernet services router to the aggregation switch, the data traffic is routed from the aggregation switch to a service switch through a security module, the security module configured to filter the data traffic. The filtered data traffic is routed from the service switch to the Ethernet services router. Upon routing the filtered data traffic from the service switch to the Ethernet services router, the filtered data traffic is routed from the Ethernet services router to a provider edge (PE) router.

According to yet another aspect, a computer-readable medium having instructions stored thereon for execution by a processor to perform a method for providing network-based security services is provided. According to the method, data traffic is routed from a customer edge (CE) router to an Ethernet services router via a generic routing encapsulation (GRE) tunnel. Upon routing the data traffic from the CE router to the Ethernet services router, the data traffic is routed from the Ethernet services router to an aggregation switch. Upon routing the data traffic from the Ethernet services router to the aggregation switch, the data traffic is routed from the aggregation switch to a service switch through a security module, the security module configured to filter the data traffic. The filtered data traffic is routed from the service switch to the Ethernet services router. Upon routing the filtered data traffic from the service switch to the Ethernet services router, the filtered data traffic is routed from the Ethernet services router to a provider edge (PE) router.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

The following detailed description is directed to methods, systems, and computer-readable media for providing network-based security services for managed Internet service. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
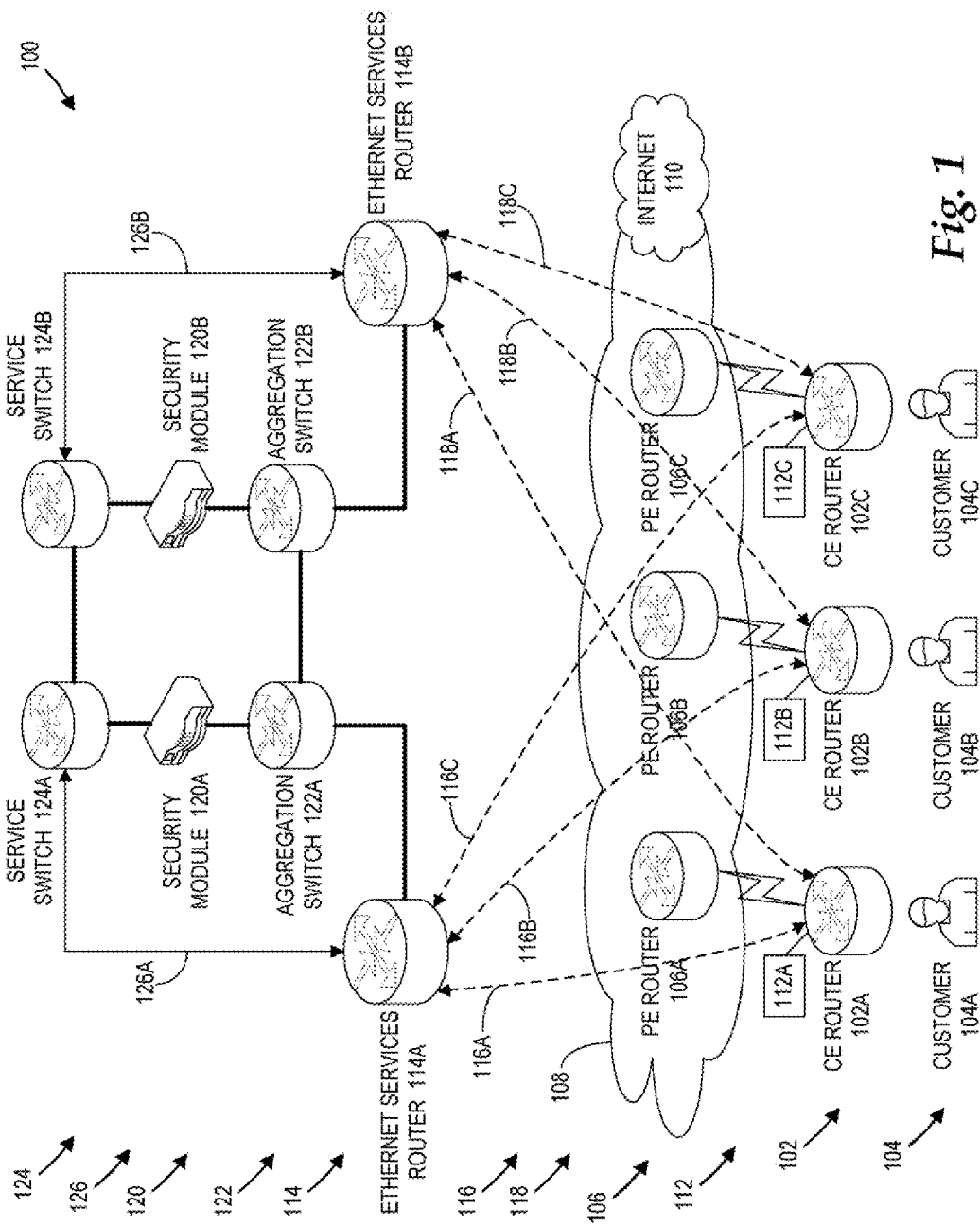
FIG. 1 is a block diagram illustrating an exemplary network environment configured to provide network-based security services for managed Internet service, in accordance with some embodiments.

In the following detailed description, references are made to the accompanying drawings that form a part hereof, and which are shown by way of illustration, specific embodiments, or examples. Referring now to the drawings, in which like numerals represent like elements through the several figures, FIG. 1 is a block diagram illustrating an exemplary network environment 100 configured to provide network-based security services for managed Internet service, in accordance with some embodiments. The network environment 100 may include a first customer edge ("CE") router 102A, a second CE router 102B, and a third CE router 102C. The CE routers 102A, 102B, 102C may be collectively referred to as CE routers 102.

The first CE router 102A may be associated with a first customer 104A, the second CE router 102B may be associated with a second customer 104B, and the third CE router 102C may be associated with a third customer 104C. The customers 104A, 104B, 104C may be collectively referred to as customers 104. Although only three CE routers 102 are illustrated in FIG. 1, it should be appreciated that any suitable number of CE routers may be implemented. Further, although in FIG. 1 each of the CE routers 102 is associated with one of the customers 104, it should be appreciated that any number of the CE router 102 may be associated with any number of the customers 104.

The first CE router 102A may be coupled to a first provider edge ("PE") router 106A, the second CE router 102B may be coupled to a second PE router 106B, and the third CE router 102C may be coupled to a third PE router 106C. The PE routers 106A, 106B, 106C (also known as access routers) may be collectively referred to as PE routers 106. The PE routers 106 may be coupled to an Internet backbone 108, which provides access to the Internet 110. Thus, as illustrated in FIG. 1, the customers 104 may access the Internet 110 through the CE routers 102, the PE routers 106, and the Internet backbone 108. An example of the CE routers 102 may be a 2600 series router from CISCO SYSTEMS, INC. An example of the PE router 106 may be any large Multiprotocol Label Switching ("MPLS") enabled router from CISCO SYSTEMS, INC.

Conventionally, a first premise-based firewall 112A may be deployed at or near the first CE router 102A, a second premise-based firewall 112B may be deployed at or near the second CE router 102B, and a third premise-based firewall 112C may be deployed at or near the third CE router 102C. The premise-based firewalls 112A, 112B, 112C may be collectively referred to as premise-based firewalls 112. In particular, each of the premise-based firewalls 112 may provide network security for a respective one of the customers 104 by monitoring inbound data traffic and/or outbound data traffic (referred to herein as simply "data traffic") at the CE routers 102. The premise-based firewalls 112 may be configured to block unauthorized data traffic and to permit authorized data traffic.

One of the drawbacks with premise-based firewalls 112 is that a separate firewall may be deployed for each of the CE routers 102 and/or each of the customers 104. As such, an Internet provider may need to monitor, maintain, repair, and/or replace each of the premise-based firewalls 112 as necessary. When the number of customers is substantial, managing such a large number of corresponding premise-based firewalls can become unduly burdensome. In order to address at least some of the drawbacks with premise-based firewalls 112, network-based security services will be described herein, in accordance with some embodiments.

As used herein, a network-based security service refers generally to a security service, such as a firewall, that is centrally managed, virtualized for each customer, and operated by the Internet provider over a suitable network, such as the Internet 110. In this way, the Internet provider can provide firewall protection and other security services without the need to deploy separate firewalls, such as the premise-based firewalls 112. These network-based security services may be referred to as being "in-the-cloud" because the security services may be provided over a network. The Internet provider may also provision and customize different network-based security services for different customers, such as the customers 104, through the network. It should be appreciated that these services may be provided in a way to virtualize some or all customers into private routing entities such that some or all processing is contained on shared platforms, thereby providing significant cost savings to both the customer and the provider.

In order to provide network-based security services for the data traffic at the CE routers 102, the data traffic at the CE routers 102 may be intercepted. In particular, as illustrated in FIG. 1, data traffic may be routed from the CE routers 102 to a first Ethernet services router 114A via generic routing encapsulation ("GRE") tunnels 116A, 116B, 116C between the first Ethernet services router 114A and the CE routers 102. The first GRE tunnel 116A may route data traffic between the first Ethernet services router 114A and the first CE router 102A. The second GRE tunnel 116B may route data traffic between the first Ethernet services router 114A and the second CE router 102B. The third GRE tunnel 116C may route data traffic between the first Ethernet services router 114A and the third CE router 102C. Although not so illustrated in FIG. 1, additional GRE tunnels may be also be provided to route data traffic between the first Ethernet services router 114B and respective additional CE routers. An example of the first Ethernet services router 114A may be a MX480 Ethernet services router from JUNIPER NETWORKS, INC.

Also as illustrated in FIG. 1, the same data traffic may also be routed from the CE routers 102 to a second Ethernet services router 114B via GRE tunnels 118A, 118B, 118C between the second Ethernet services router 114B and the CE routers 102. The first GRE tunnel 118A may route data traffic between the second Ethernet services router 114B and the first CE router 102A. The second GRE tunnel 118B may route data traffic between the second Ethernet services router 114B and the second CE router 102B. The third GRE tunnel 118C may route data traffic between the second Ethernet services router 114B and the third CE router 102C. An example of the second Ethernet services router 114B may also be a MX480 Ethernet services router from JUNIPER NETWORKS, INC.

In some embodiments, the second Ethernet services router 114B may be provided as a back-up to the first Ethernet services router 114 in case, for example, the first Ethernet services router 114 fails. Although not so illustrated in FIG. 1, additional Ethernet services routers may be provided as necessary for additional redundancy. The first Ethernet services router 114A and the second Ethernet services router 114B may be collectively referred to as Ethernet services routers 114. The GRE tunnels 116A, 116B, 116C may be collectively referred to as GRE tunnels 116. The GRE tunnels 118A, 118B, 118C may be collectively referred to as GRE tunnels 118.

When the Ethernet services routers 114 intercept the data traffic from the CE routers 102, the Ethernet services routers 114 may forward the data traffic to security modules 120A, 120B via aggregation switches 122A, 122B. In particular, the first Ethernet services router 114A may forward the data traffic to the first security module 120A via the first aggregation switch 122A. The second Ethernet services router 114B may forward the data traffic to the second security module 120B via the second aggregation switch 122B.

The security modules 120A, 120B may be collectively referred to as security modules 120. The security modules 120 may be any suitable device configured to provide network-based security services. The security modules 120 may be configured to provide, among other services, a stateful firewall (i.e., a firewall that maintains the state of network connections), an intrusion detection system ("IDS"), uniform resource locator ("URL) screening, email security, and web security. An example of the security modules 120 may be a FORTIGATE security appliance from FORTINET, INC. The aggregation switches 122A, 122B may be collectively referred to as aggregation switches 122. An example of the aggregation switches 122 may be a CATALYST 6500 series aggregator switch from CISCO SYSTEMS, INC.

The security modules 120 may filter data traffic passing from the aggregation switches 122 to the service switches 124. In particular, the security modules 120 may block at least some of the data traffic, while permitting some other data traffic. The data traffic that is permitted through the security modules 120 may be routed to service switches 124A, 124B. The service switches 124A, 124B may be collectively referred to as service switches 124. An example of the service switches 124 may be a CATALYST 6500 series service switch from CISCO SYSTEMS, INC. An aggregation element, such as the aggregation switches 122, provides the termination of customer GRE Tunnels in addition to the connection to the Internet 110. A service element, such as the service switches 124, provides the proper separation of traffic from various Internet Service Customer Bases, e.g., the Internet Service Provider ("ISP") MPLS customer base and the ISP Managed Internet Service ("MIS") customer base. In addition the service element acts a provider of other services on the ISP demilitarized zone ("DMZ"), e.g., Domain Name System ("DNS") caching, mail relay, virus screening, etc.

When the filtered data traffic reaches the service switches 124, the filtered data traffic may be routed from the service switches 124 to the Ethernet services routers 114 via Internet return paths 126A, 126B. In particular, first Ethernet services router 114A may be coupled to the first service switch 124A via the first Internet return path 126A. The second Ethernet services router 114B may be coupled to the second service switch 124B via the second Internet return path 126B. The Internet return paths 126A, 126B may be collectively referred to as Internet return paths 126. When the filtered data traffic reaches the Ethernet services routers 114, the Ethernet services routers 114 may route the filtered data traffic to the PE routers 106. For the sake of simplicity, Ethernet links between the Ethernet services routers 114 and the PE routers 106 are not shown in FIG. 1. The PE routers 106 may then route the filtered data traffic to the Internet 110 through the Internet backbone 108.

Figure 2:
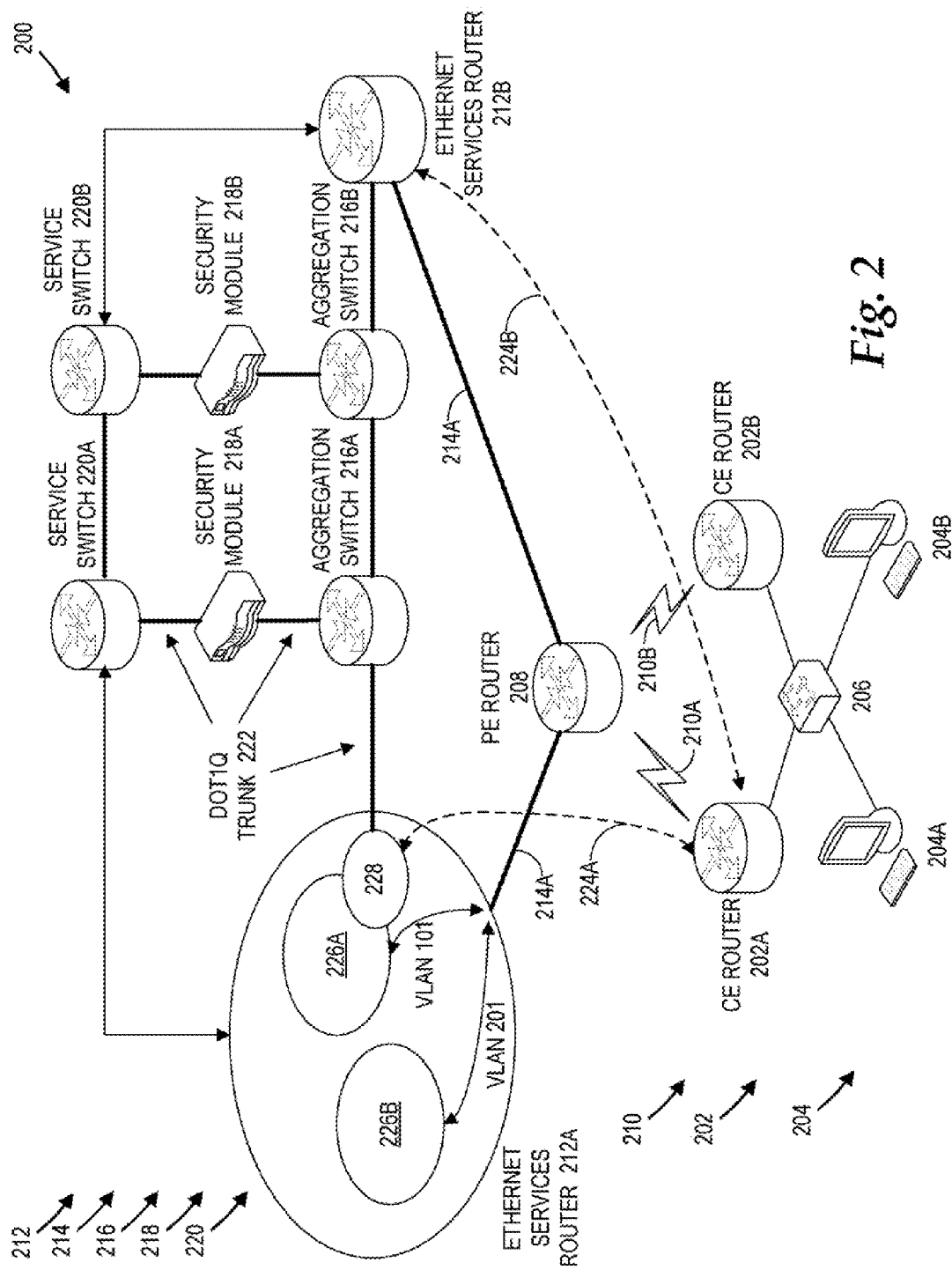
FIG. 2 is a block diagram illustrating an exemplary network environment configured to provide network-based security services for managed Internet service, in accordance with some embodiments.

FIG. 2 is a block diagram illustrating an exemplary network environment 200 configured to provide network-based security services for managed Internet service, in accordance with some embodiments. As illustrated in FIG. 2, a first CE router 202A and a second CE router 202B may be coupled to a first customer host 204A associated and a second customer host 204B via a switch 206. The CE routers 202A, 202B may be collectively referred to as CE routers 202. The customer hosts 204A, 204B may be collectively referred to as customer hosts 204.

The CE routers 202 may be coupled to a PE router 208 via T1 circuits 210A, 210B. The T1 circuits 210A, 210B may be collectively referred to as T1 circuits 210. The PE router 208 may be coupled to Ethernet services routers 212A, 212B via Ethernet links 214A, 214B. The Ethernet services routers 212A, 212B may be collectively referred to as Ethernet services routers 212. The Ethernet links 214A, 214B may be collectively referred to as Ethernet links 214. The Ethernet services routers 212 may be coupled to aggregation switches 216A, 216B, which may further be coupled to security modules 218A, 218B. The aggregation switches 216A, 216B may be collectively referred to as aggregation switches 216. The security modules 218A, 218B may be collectively referred to as security modules 218. The security modules 218A, 218B may be coupled to service switches 220A, 220B, which may further be coupled to the Ethernet services routers 212. The service switches 220A, 220B may be collectively referred to as service switches 220. The Ethernet services routers 212, the aggregation switches 216, and the security modules 218 may be coupled via a dot1Q trunk 222.

In the network environment 200, data traffic may be routed from the first CE router 202A to the Ethernet services routers 212 via GRE tunnels 224A, 224B. The GRE tunnels 224A, 224B may be collectively referred to as GRE tunnels 224. An expanded view of the first Ethernet services router 212A is illustrated in FIG. 2 and will now be described in greater detail. It should be appreciated that the configuration and operation of the second Ethernet services router 212B and other Ethernet services routers (not shown) may be similar to the configuration and operation of the first Ethernet services router 212A.

According to some embodiments, the first Ethernet services router 212A may be configured with two virtual local area networks ("VLANs") 226A, 226B and a customer tunnel 228. The VLANs 226A, 226B may be collectively referred to as VLANs 226. The VLANs 226 may be isolated on the first Ethernet link 214A. The first VLAN 226A may operate under VLAN 101, and the second VLAN 226B may operate under VLAN 201. The customer tunnel 228, which may be associated with one of the customer hosts 204, may receive data traffic from the first CE router 202A via the first GRE tunnel 224A. The customer tunnel 228 may then traverse the dot1Q trunk 222 from the first Ethernet services router 212A, to the first aggregation switch 216A, to the first security module 218A, and to the first service switch 220A. The first VLAN 226A may be configured to provide GRE tunnel termination for one or more of the customer hosts 204. The second VLAN 226B may be configured to communicate over the Internet 110.

According to some embodiments, the first VLAN 226A may host a virtual routing element adapted to terminate all customer GRE Tunnels. The first VLAN 226A may host additional virtual routing elements, e.g., an additional virtual router inside a virtual router. A virtual router may be defined by interfaces, which, in the case of the customer tunnel 228, includes the GRE tunnel 224A and a dedicated sub-interface from the dot1Q trunk 222. It should be appreciated that several customers can ride on the dot1Q trunk 222 and be essentially in their own private Layer-2/3 path between the aggregation and service switches 216, 220.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

Figure 3:
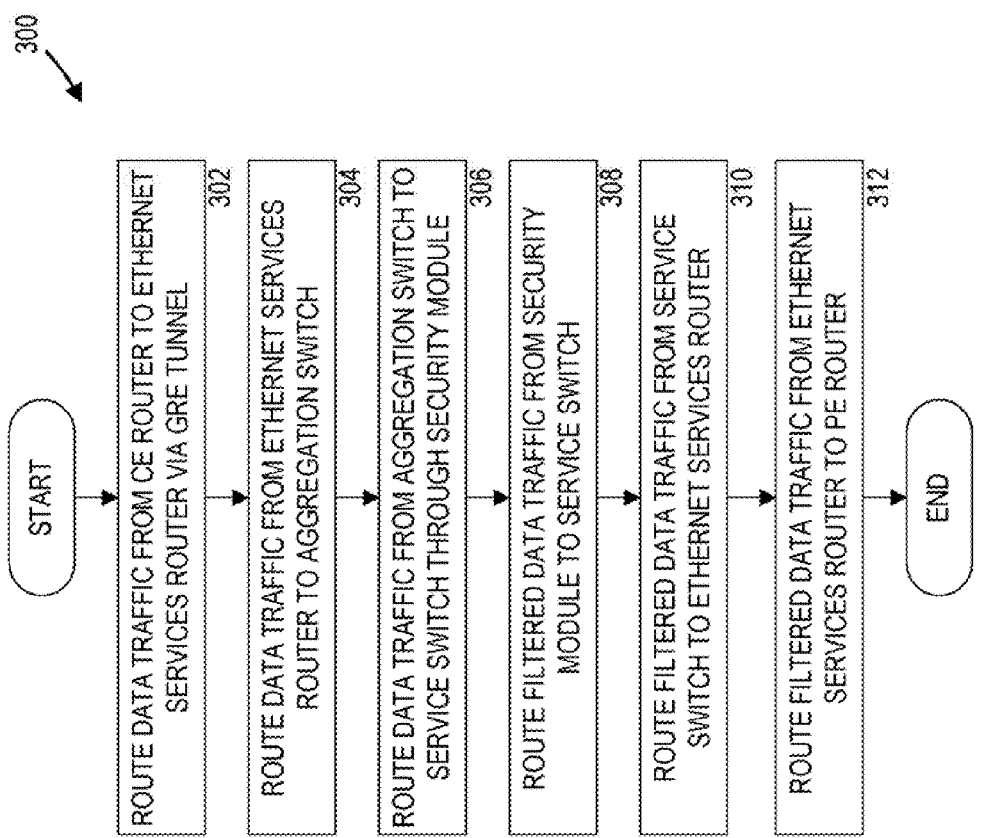
FIG. 3 is a flow diagram illustrating an exemplary method for providing network-based security services for managed Internet service, in accordance with some embodiments.

Referring to FIG. 3, additional details will be provided regarding the network environments 100, 200. In particular, FIG. 3 is a flow diagram illustrating an exemplary method 300 for providing network-based security service for Internet service customers, in accordance with some embodiments. For the sake of simplicity, the method 300 will be described with reference to the network environment 100 of FIG. 1, although the method 300 may apply similarly to the network environment 200 of FIG. 2.

The method 300 begins at operation 302, where data traffic is routed from the CE routers 102 to the Ethernet services routers 114 via GRE tunnels 116. The method 300 then proceeds to operation 304, where the data traffic is routed from the Ethernet services routers 114 to the aggregation switches 122. The method 300 then proceeds to operation 306, where the data traffic is routed from the aggregation switches 122 to the security modules 120. According to some embodiments, the security modules 120 may be configured to filter the data traffic according to any suitable network-based security services. Examples of network-based security services may include, but are not limited to, a stateful firewall, an IDS, URL screening, email security, and web security. Upon filtering the data traffic, the method 300 proceeds to operation 308.

At operation 308, the filtered data traffic is routed from the security modules 120 to the service switches 124. The method 300 then proceeds to operation 310, where the filtered data traffic is routed from the service switches 124 to the Ethernet services routers 114. Then method 300 then proceeds to operation 312, where the filtered data traffic is routed from the Ethernet services routers 114 to the PE routers 106. The filtered data traffic may enter the Internet 110 through the Internet backbone 108 coupled to the PE routers 106.

Figure 4:
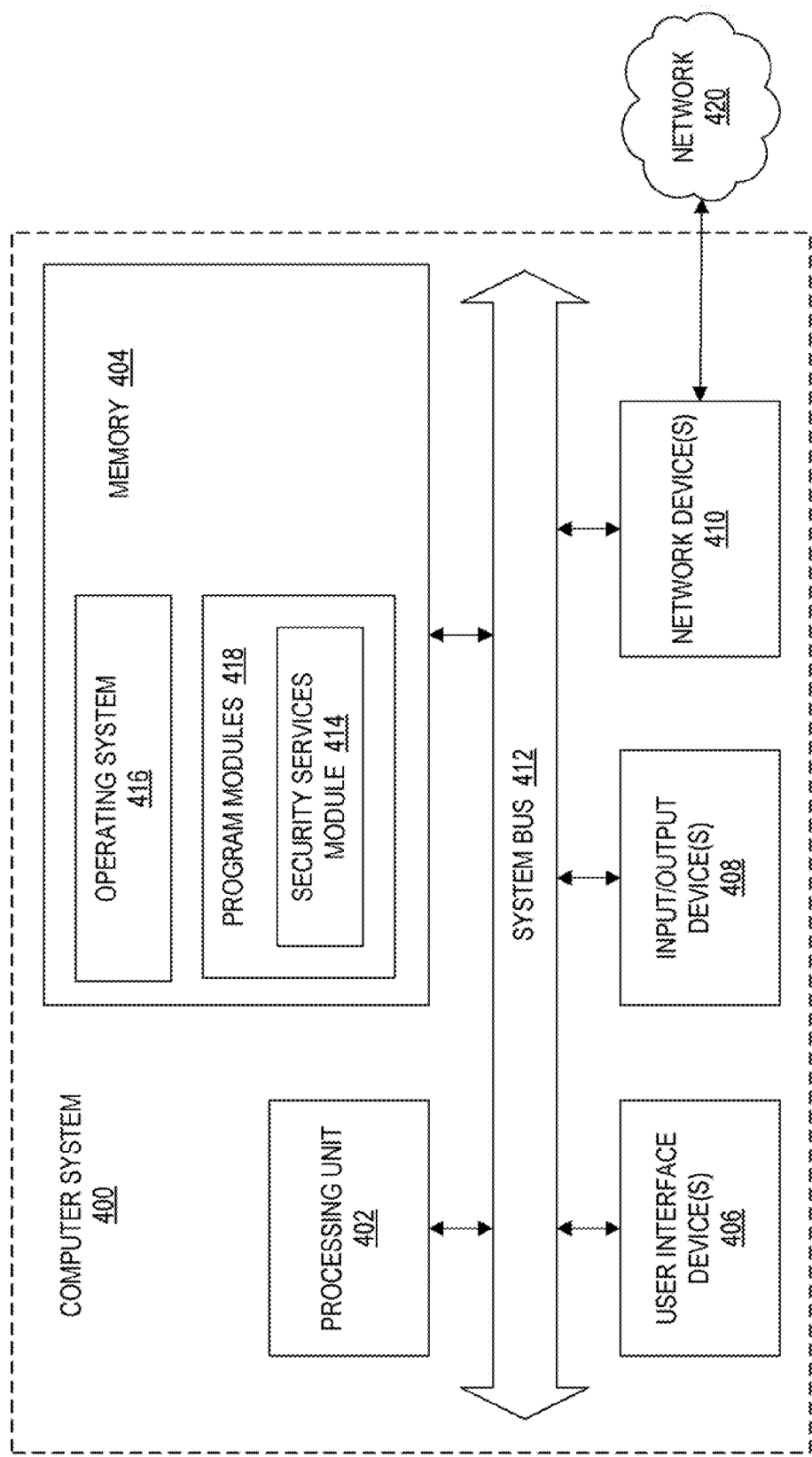
FIG. 4 is a block diagram illustrating an exemplary computer system configured to provide network-based security services for managed Internet service, in accordance with some embodiments.

FIG. 4 and the following discussion are intended to provide a brief, general description of a suitable computing environment in which embodiments may be implemented. While embodiments will be described in the general context of program modules that execute in conjunction with an application program that runs on an operating system on a computer system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. The embodiments may also be practiced in distributed computing environments where tasks are performed by remote processing devices that are linked through a communications network. In a distributed computing environment, program modules may be located in both local and remote memory storage devices.

FIG. 4 is a block diagram illustrating a computer system 400 configured to provide network-based security services for managed Internet service, in accordance with embodiments. The computer system 400 includes a processing unit 402, a memory 404, one or more user interface devices 406, one or more input/output ("I/O") devices 408, and one or more network devices 410, each of which is operatively connected to a system bus 412. The bus 412 enables bi-directional communication between the processing unit 402, the memory 404, the user interface devices 406, the I/O devices 408, and the network devices 410.

The processing unit 402 may be a standard central processor that performs arithmetic and logical operations, a more specific purpose programmable logic controller ("PLC"), a programmable gate array, or other type of processor known to those skilled in the art and suitable for controlling the operation of the server computer. Processing units are well-known in the art, and therefore not described in further detail herein.

The memory 404 communicates with the processing unit 402 via the system bus 412. In one embodiment, the memory 404 is operatively connected to a memory controller (not shown) that enables communication with the processing unit 402 via the system bus 412. The memory 404 includes an operating system 416 and one or more program modules 418, according to exemplary embodiments. Examples of operating systems, such as the operating system 416, include, but are not limited to, WINDOWS, WINDOWS CE, and WINDOWS MOBILE from MICROSOFT CORPORATION, LINUX, SYMBIAN from SYMBIAN LIMITED, BREW from QUALCOMM CORPORATION, MAC OS from APPLE CORPORATION, and FREEBSD operating system. The program modules 418 include a security services module 414. In some embodiments, the security services module 414 is embodied in computer-readable media containing instructions that, when executed by the processing unit 402, performs the method 300 for providing network-based security services, as described in greater detail above with respect to FIG. 3. According to embodiments, the program modules 418 may be embodied in hardware, software, firmware, or any combination thereof.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 400.

The user interface devices 406 may include one or more devices with which a user accesses the computer system 400. The user interface devices 406 may include, but are not limited to, computers, servers, personal digital assistants, cellular phones, or any suitable computing devices. The I/O devices 408 enable a user to interface with the program modules 418. In one embodiment, the I/O devices 408 are operatively connected to an I/O controller (not shown) that enables communication with the processing unit 402 via the system bus 412. The I/O devices 408 may include one or more input devices, such as, but not limited to, a keyboard, a mouse, or an electronic stylus. Further, the I/O devices 408 may include one or more output devices, such as, but not limited to, a display screen or a printer.

The network devices 410 enable the computer system 400 to communicate with other networks or remote systems via the network 420. Examples of the network devices 410 may include, but are not limited to, a modem, a radio frequency ("RF") or infrared ("IR") transceiver, a telephonic interface, a bridge, a router, or a network card. The network 420 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 420 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

What is claimed is:

1. A method comprising:
routing, at a customer edge router, intercepted data traffic to a first Ethernet services router via a generic routing encapsulation tunnel;
routing, at the first Ethernet services router, the intercepted data traffic to an aggregation switch;
routing, at the aggregation switch, the intercepted data traffic to a service switch through a security module, wherein the security module filters the intercepted data traffic to generate filtered data traffic;
routing, at the service switch, the filtered data traffic to a second Ethernet services router; and
routing, at the second Ethernet service router, the filtered data traffic to a provider edge router which provides access to an internet.

2. The method of claim 1, wherein the provider edge router is coupled to an Internet backbone.

3. The method of claim 1, further comprising:
routing, at the customer edge router, the data traffic to a second Ethernet services router via a second generic routing encapsulation tunnel;
routing, at the second Ethernet services router, the data traffic to a second aggregation switch;
routing, at the second switch, the data traffic to a second service switch through a second security module, the second security module configured to filter the data traffic to generate second filtered data traffic;
routing, at the second service switch, the second filtered data traffic to the second Ethernet services router; and
routing, at the second Ethernet services router, the second filtered data traffic to the provider edge router.

4. The method of claim 1, wherein the security module, in being configured to filter the data traffic, is configured to filter the data traffic via a stateful firewall.

5. The method of claim 1, wherein the security module, in being configured to filter the data traffic, is configured to filter the data traffic via uniform resource locator screening.

6. The method of claim 1, wherein the Ethernet services router comprises a first virtual local area network configured to provide tunnel termination and a second virtual local area network configured to access an Internet.

7. The method of claim 6, wherein the Ethernet services router further comprises a customer tunnel configured to traverse the aggregation switch, the security module, and the service switch.

8. system comprising:
a customer edge router;
a first Ethernet services router;
a second Ethernet services router;
an aggregation switch;
a service switch; and
a security module;
wherein the customer edge router routes intercepted data traffic to the first Ethernet services router via a generic routing encapsulation tunnel, the first Ethernet services router routes the intercepted data traffic to an aggregation switch, the aggregation switch routes the intercepted data traffic to a service switch through a security module, the security module filters the intercepted data traffic to generate filtered data traffic, the service switch routes the filtered data traffic to the second Ethernet services router, and the second Ethernet service router routes the filtered data traffic to the provider edge router which provides access to an internet.

9. The system of claim 8, wherein the provider edge router is coupled to an Internet backbone.

10. The system of claim 8, wherein:
the customer edge router is further configured to route the data traffic to a second Ethernet services router via a second generic routing encapsulation tunnel;
the second Ethernet services router is further configured to route the data traffic to a second aggregation switch;
the second aggregation switch is further configured to route the data traffic to a second service switch through a second security module, the second security module being configured to filter the data traffic to generate second filtered data traffic;
the second service switch is further configured to route the second filtered data traffic to the second Ethernet services router; and
the second Ethernet services router is further configured to route the second filtered data traffic to the provider edge router.

11. The system of claim 8, wherein the security module, in being configured to filter the data traffic, is configured to filter the data traffic via a stateful firewall.

12. The system of claim 8, wherein the security module, in being configured to filter the data traffic, is configured to filter the data traffic via uniform resource locator screening.

13. The system of claim 8, wherein the Ethernet services router comprises a first virtual local area network configured to provide tunnel termination and a second virtual local area network configured to access an Internet.

14. A non-transitory computer-readable medium having instructions stored thereon execution that, when executed by a processor, cause the processor to perform operations comprising:
routing, at a customer edge router, intercepted data traffic to a first Ethernet services router via a generic routing encapsulation tunnel;
routing, at the first Ethernet services router, the intercepted data traffic to an aggregation switch;
routing, at the aggregation switch, the intercepted data traffic to a service switch through a security module, the security module being configured to filter the intercepted data traffic to generate filtered data traffic;

routing, at the service switch, the filtered data traffic to a second Ethernet services router; and routing, at the second Ethernet service router, the filtered data traffic to a provider edge router which provides access to an internet.

15. The computer-readable medium of claim 14, having further instructions stored thereon that, when executed by the processor, cause the processor to perform a further operation comprising causing the provider edge router to connect to an Internet backbone.

16. The computer-readable medium of claim 14, having further instructions stored thereon that, when executed by the processor, cause the processor to perform further operations comprising:

routing, at the customer edge router, the data traffic to a second Ethernet services router via a second generic routing encapsulation tunnel;

routing, at the second Ethernet services router, the data traffic to a second aggregation switch;

routing, at the second switch, the data traffic to a second service switch through a second security module, the second security module being configured to filter the data traffic to generate second filtered data traffic;

routing, at the second service switch, the second filtered data traffic to the second Ethernet services router; and routing, at the second Ethernet services router, the second filtered data traffic to the provider edge router.

17. The computer-readable medium of claim 14, having further instructions stored thereon that, when executed by the processor, cause the processor to perform a further operation comprising causing the security module to filter the data traffic via a stateful firewall.

18. The computer-readable medium of claim 14, having further instructions stored thereon that, when executed by the processor, cause the processor to perform a further operation comprising causing the security module to filter the data traffic via uniform resource locator screening.

19. The computer-readable medium of claim 14, having further instructions stored thereon that, when executed by the processor, cause the processor to perform a further operation comprising causing the Ethernet services router to provide tunnel termination via a first virtual local area network and to provide access to an Internet via a second virtual local area network.

20. The computer-readable medium of claim 14, having further instructions stored thereon that, when executed by the processor, cause the processor to perform a further operation comprising causing the Ethernet services router to utilize a customer tunnel to traverse the aggregation switch, the security module, and the service switch.

* * * * *